(12) United States Patent
Meier et al.

(10) Patent No.: US 7,936,762 B2
(45) Date of Patent: May 3, 2011

(54) QOS PROVISIONING IN A NETWORK HAVING DYNAMIC LINK STATES

(75) Inventors: John L. Meier, St. Charles, MO (US); Kent L. English, St. Charles, MO (US); Arun Ayyagari, Seattle, WA (US); Guijun Wang, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/502,218

(22) Filed: Jul. 13, 2009

(65) Prior Publication Data
US 2009/0274045 A1 Nov. 5, 2009

Related U.S. Application Data

(63) Continuation-in-part of application No. 11/008,372, filed on Dec. 9, 2004, now Pat. No. 7,561,521.

(51) Int. Cl.
*H04L 12/28* (2006.01)

(52) U.S. Cl. .................... 370/395.21; 370/389
(58) Field of Classification Search .................. 370/231, 370/236.1, 236.2, 242, 241.1, 248, 252, 373, 370/384, 389, 377, 395.21
See application file for complete search history.

(56) References Cited

U.S. PATENT DOCUMENTS

| | | | | |
|---|---|---|---|---|
| 5,933,425 A | * | 8/1999 | Iwata | 370/351 |
| 6,944,675 B2 | * | 9/2005 | Fujita | 709/240 |

* cited by examiner

*Primary Examiner* — Brenda Pham

(57) ABSTRACT

A network node for a network having dynamic link states includes a processing unit and computer-readable memory for causing the processing unit to monitor a link state of the network; perform QoS provisioning and make appropriate updates to the QoS provisioning based on changes in the link state and QoS provisioning demands of QoS-aware applications; and provide notification to the QoS-aware applications to allow those applications to dynamically adapt to the link state changes.

10 Claims, 5 Drawing Sheets

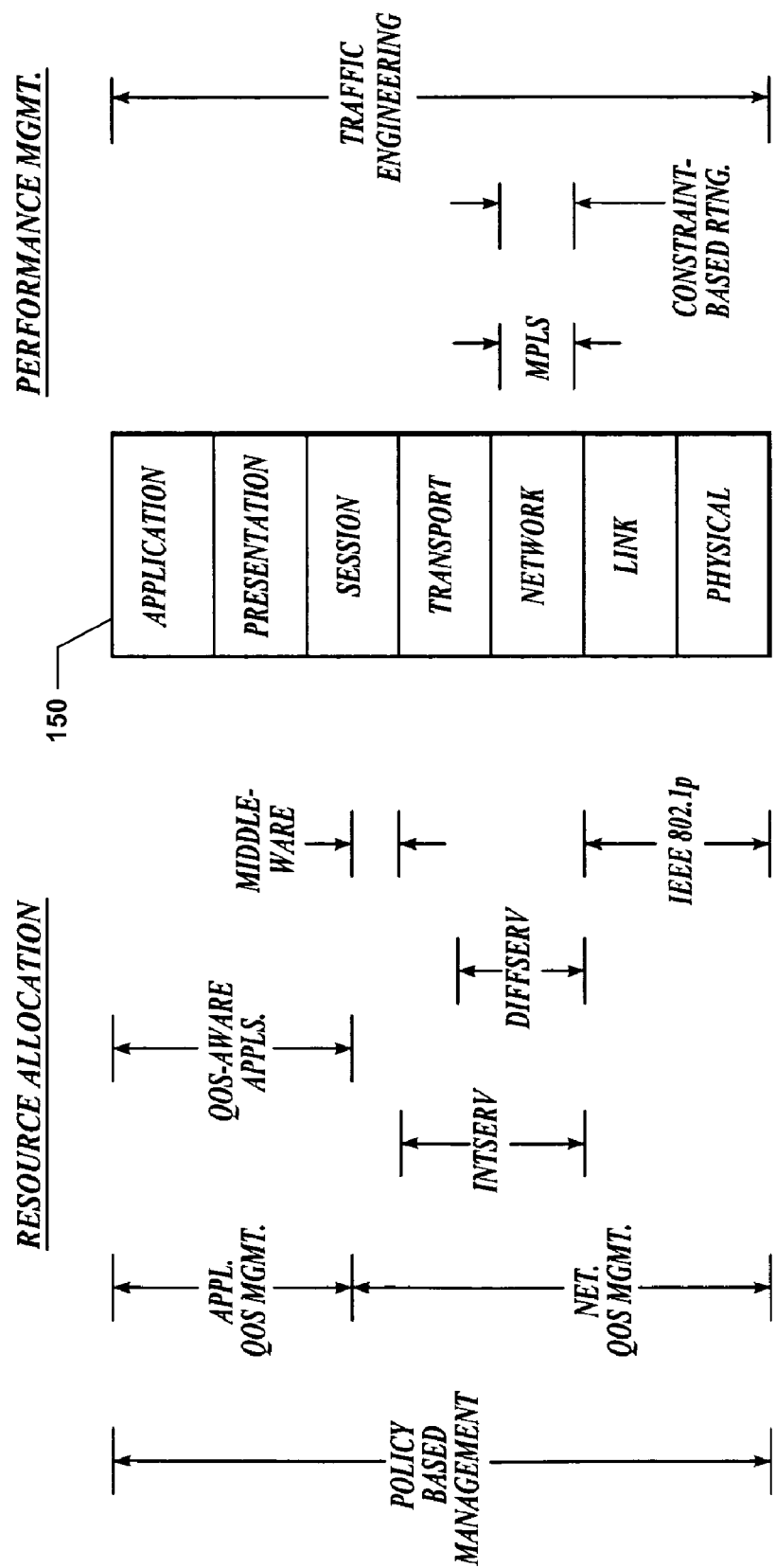

QOS PROVISIONING IN A NETWORK HAVING DYNAMIC LINK STATES

BACKGROUND

Quality of service (QoS) is desired by most customers operating in a network centric organization (NCO). QoS ensures high-quality performance for critical applications.

Traditional networks are based on destination-based routing and typically do not actively manage network resources in determining resource allocation. In traditional networks, link states and bandwidth characteristics are static. Conventional QoS provisioning technologies assume stable link connectivity and link characteristics, i.e., link up/down state and link bandwidth capacity.

This assumption is not valid for non-traditional networks having link states and bandwidth characteristics that are dynamic. One such network is a dynamic mobile ad hoc heterogeneous network having mobile nodes at the network's edge and mobile nodes at the network's core infrastructure. The dynamic mobile ad hoc heterogeneous network has link state characteristics that vary in real time.

There is a need for QoS provisioning for networks having dynamic link states and bandwidth characteristics.

SUMMARY

According to an embodiment herein, a network node for a network having dynamic link states comprises a processing unit and computer-readable memory for causing the processing unit to monitor a link state of the network; perform QoS provisioning and make appropriate updates to the QoS provisioning based on changes in the link state and QoS provisioning demands of QoS-aware applications; and provide notification to the QoS-aware applications to allow those applications to dynamically adapt to the link state changes.

According to another embodiment herein, a system comprises means for controlling how a packet is passed over a network using a differentiated services portion of a network management architecture; means for monitoring network link state; means for monitoring a request for a Quality of Service (QoS) level from at least one QoS-aware application; and means for adjusting at least one service rate of packet travel controlled by the differentiated services portion by mapping a connection to an appropriate QoS provisioning mechanism. The adjustment to the service rate of packet travel is based on change in network link state and the requested QoS level and an available bandwidth. The system further comprises means for providing a notification of the change in link state.

According to another embodiment herein, an article comprises memory encoded with a QoS Service Provider, kernel and QoS-enhanced socket API for causing a processor to perform QoS provisioning of traffic over a network during requested sessions with QoS-aware applications via dynamic links. The QoS provisioning includes scheduling of traffic on the network. Link states demanded by the QoS-aware applications are monitored, and the scheduled traffic is updated based on changes to the link states.

BRIEF DESCRIPTION OF THE DRAWINGS

FIG. 2a is an illustration of a plurality of QoS technologies for achieving end-to-end QoS provisioning.

DETAILED DESCRIPTION

Figure 1:
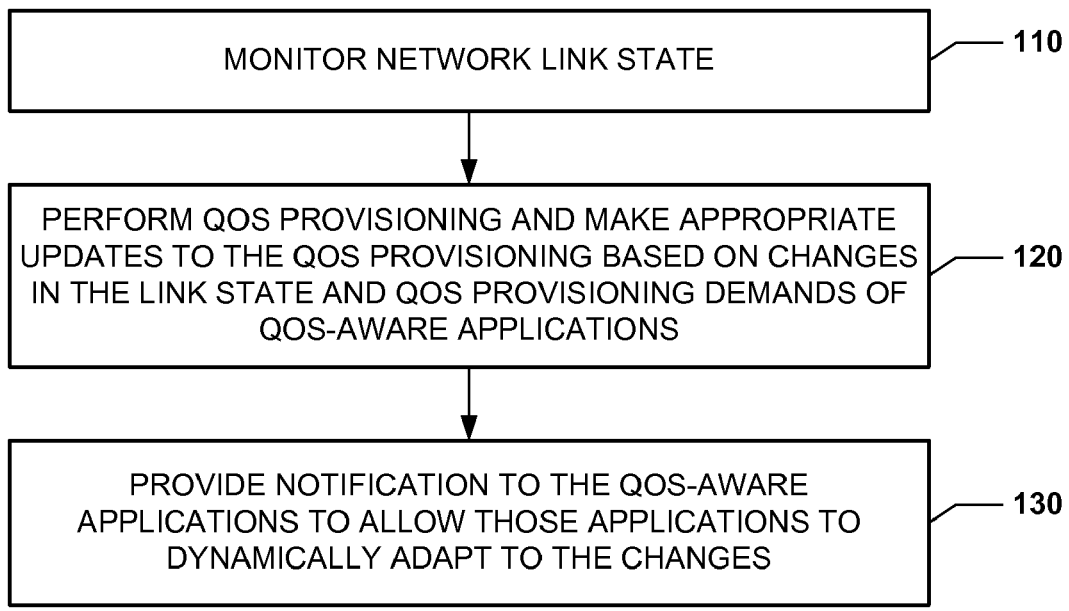
FIG. 1 is an illustration of a method for managing a network having dynamic link state and dynamic bandwidth characteristics.

Reference is made to FIG. 1, which illustrates a method for managing a network having dynamic link states. Link states may include information such as link rate, bandwidth utilization, link bit error rate, link up time, etc. The method includes monitoring a link state of the network (block 110); performing QoS provisioning and making appropriate updates to the QoS provisioning based on changes in the link state and QoS provisioning demands of QoS-aware applications (block 120); and providing notification to the QoS-aware applications to allow those applications to dynamically adapt to the changes (block 130).

The method of FIG. 1 is especially useful for dynamic mobile ad hoc heterogeneous networks and other networks having link states and bandwidth characteristics that vary. Link states can change in dynamic mobile ad hoc heterogeneous networks for the following reasons: the link margin for the wireless communication link between pairs of nodes can vary due to changing distance between the nodes; and external communication interference, such as RF interference, can cause the transmission rate to be varied, whereby link connectivity for bit error rates is below the desired threshold. Link states may also change due to other long term externalities such as weather effects (e.g., rain and fog). The method of FIG. 1 improves network end-to-end resource allocation to help to ensure that QoS requirements of various traffic flows are at least partially satisfied.

Reference is made to FIG. 2a. A method herein can be implemented by QoS technologies that follow a standard OSI model or stack 150 (link layer, physical layer, network layer, transport layer, session layer, presentation layer, application layer). The lower layer network stack elements such as the physical and link layer elements (which are normally implemented within the kernel mode of an operating system) will detect the changes in real-time and notify the QoS Service Provider.

QoS technologies that enable performance assurance and service differentiation in the OSI model 150 can be broadly classified into resource allocation and performance management. Architectural components of performance management may include Multi-Protocol Label Switching (MPLS) and constraint-based routing at the network layer, and traffic engineering that is applicable to all layers of the OSI model 150.

One possible objective of performance management is to determine and establish a path that each traffic flow should take in order to maximize the number of end-to-end user application sessions whose QoS requirements have been satisfied, while maximizing the overall network utilization. Based on changes in the link states, the network can establish alternate paths and route the traffic along the created paths to ensure QoS provisioning demands of the QoS-aware applications.

Architectural components of resource allocation may include IEEE 802.x at the link and physical layers; integrated services (IntServ) at the network and transport layers to specify the elements to guarantee quality of service (QoS); Differentiated Services (DiffServ) at the network layer to classify, manage network traffic and provide QoS guarantees;

middleware at and above the session layer to implement various data processing, storing and dissemination mechanisms; and QoS-aware applications at the session, presentation and application levels.

Figure 2B:
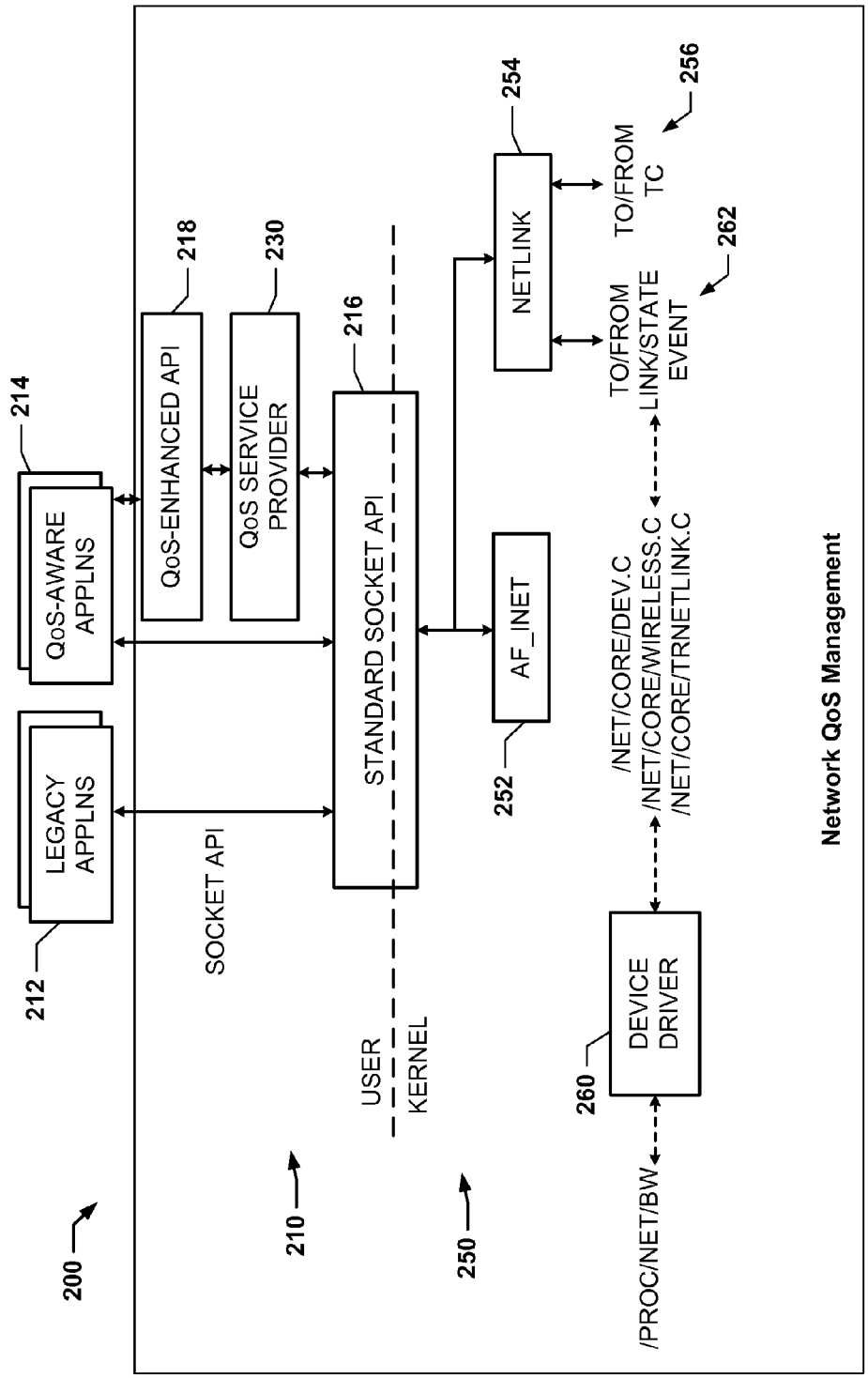
FIG. 2b is an illustration of a network QoS management architecture.

FIG. 2b illustrates a network QoS management architecture 200. The architecture includes a standard Socket Application Programming Interface (API) 216 (e.g., a standard BSD Socket API) and a QoS-enhanced Socket API 218.

Legacy applications 212 and QoS-aware applications 214 are coupled to the QoS-enhanced Socket API 218 and thereby interface with a QoS Service Provider 230. The QoS Service Provider 230, in turn, couples with the standard Socket API 216 to enable QoS provisioning for both the QoS-aware and legacy applications 214 and 212. The QoS-aware applications 214 interface with the QoS-enhanced Socket API 218. In some embodiments, the QoS-enhanced Socket API 218 is a part of the QoS Service Provider 230. The QoS Service Provider 230 shields the QoS-aware applications 214 from complexity of tracking or following directly the link state characteristics by interfacing directly with the respective kernel mode components.

A kernel 250 within an operating system includes a data plane such as AF_INET portion 252 and control plane such as NETLINK portion 254. The data and control planes are used for the transmission and reception of data and signaling information respectively between the standard Socket API 216 and the lower layers of the network stack that are implemented as kernel mode elements within an software operating systems implementation.

The standard Socket API 216 is used by all user mode 210 data and control plane interchange between the upper and lower layers of the network stack. This is used for the QoS provisioning and management for both IntServ and DiffServ.

IntServ signaling uses the standard Socket API 216 for the transmission and reception of IntServ RSVP signaling. The QoS Service Provider 230 also uses the standard Socket API 216 to monitor and configure the lower layers of the network stack for DiffServ.

The QoS Service Provider 230 within a given node enables QoS provisioning and management for both DiffServ and IntServ based communications resource management within the given node and across the network. QoS-aware applications 214 establish sessions with peer applications via the QoS Service Provider 230. The QoS Service Provider 230 performs session admission control and appropriately performs QoS provisioning for the requested session. Once the QoS Service Provider 230 accepts a session connection request from QoS-aware Applications 214 (via the QoS-enhanced Socket API 218), it establishes socket level session via the standard Socket API 216. Following the establishment of the session between the QoS-aware Applications 214 and the peer application, the QoS-aware Applications 214 transmit and receive data via the standard Socket API 216. Legacy applications 212 interact with peer applications by setting up sessions via the standard Socket API 216. The legacy applications 212 also transmit and receive data via Socket API 216. The standard Socket API 216 interacts with AF_INET 252 and NETLINK 254. Socket level session communication with peer entity is directed to and from AF_INET 252.

The QoS Service Provider 230 uses the NETLINK 254 to configure and monitor underlying Traffic Control (TC) components 256 such as a scheduler. In one embodiment, the scheduler may be a DiffServ scheduler. In addition, the QoS Service Provider 230 also interacts with NETLINK 254 which in turn interacts with the underlying device driver 260 to query and obtain Link State Events 262.

In one particular embodiment, the network QoS management architecture 200 includes a standard DiffServ portion. Various DiffServ architectures are known and may be suitable for this purpose, including, for example, those architectures generally disclosed in "An Architecture for Differentiated Services" by S. Blake et al., The Internet Society, RFC 2475, December 1998. Generally, the standard DiffServ portion assumes a stable link bandwidth capacity and interconnectivity state in QoS provisioning.

Based on the information in a QoS request from a QoS-aware application 214, the QoS Service Provider 230 will map the connection to the appropriate QoS provisioning mechanism. For example, if the underlying QoS mechanism is DiffServ, the QoS Service Provider 230 may set up TC configurations in order to route packets from that connection into the assigned DiffServ class, and may perform DSCP marking based on the configuration associated with a given tuple space. The QoS Service Provider 230 may also be adapted to provide notification to remote applications when network resource conditions change.

Monitoring and notifying of the TC components 256 and link state events 262 are performed by the QoS Service Provider 230 via Socket API 216 and Netlink 254. This information is appropriately conveyed to QoS-aware application 214 by the QoS Service Provider 230 via the QoS enhanced Socket API 218. The QoS Service Provider 230 performs the updating of the TC components 256, which may include how the queues are serviced (i.e., order), how new packets are enqueued, etc. Thus, in the architecture 200 of FIG. 2b, the QoS-aware applications 214 do not have to track the link states.

To accommodate a network having dynamic link state and dynamic bandwidth characteristics (e.g., a dynamic mobile ad hoc heterogeneous network), some embodiments of the network QoS architecture 200 include an extension portion to account for the dynamic link state and bandwidth characteristics. The extension portion dynamically updates the packet transmit scheduler as link states change. It allows the standard DiffServ portion to operate as if the link states and bandwidth are stable.

Figure 3:
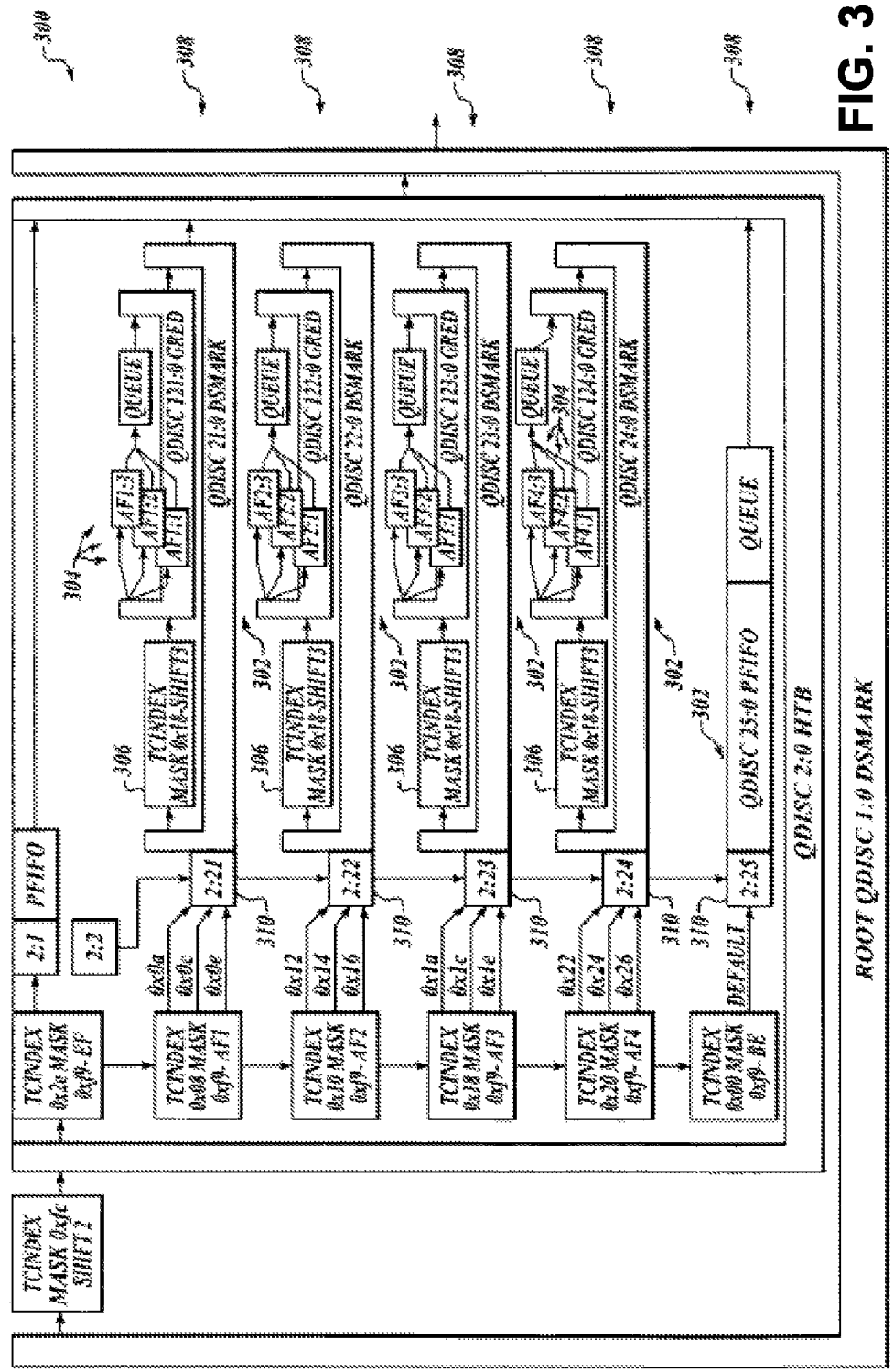
FIG. 3 is an illustration of a scheduler.

FIG. 3 illustrates an embodiment of a scheduler 300, which is a part of overall TC components and is used to implement the standard DiffServ-based QoS provisioning. The scheduler 300 may be implemented in Linux using the traffic control (TC) elements of queuing disciplines (qdiscs) 302, classes 304, and filters 306. Each network interface 308 may have a qdisc 302 associated with it, which will control how packets are sent over that interface. Some qdiscs 302 are classful and may have multiple classes 304. In order for a qdisc 302 to assign a packet to a particular class 304, filters 306 may be used to classify packets and assign them to the appropriate class 304. In general, a class 304 may have a qdisc 302 attached to it so that elaborate combinations of TC elements can be constructed. A filter 306 may have a policer 310 attached to it that will meter the flow through that policer 310 and produce an action if the flow exceeds a specified rate.

Returning to FIG. 2b, in one particular embodiment, the QoS Service Provider 230 may be adapted to look at local statistics acquired through queries to rtnetlink socket connections. The QoS Service Provider 230 may also request statistics locally or from another host on the network through some mechanism such as an SNMP subagent that implements a DiffServ Management Information Base (MIB). In further embodiments, the QoS Service Provider 230 may provide two main services. A first service is a QoS-enhanced Socket API function through which QoS-aware applications may request certain levels of QoS for network connections. A second service is a mechanism for the underlying DiffServ implementation to adjust the service rates of its classes based on the available bandwidth as reported by the network device.

The QoS Service Provider 230 may also be implemented as a user-level daemon that listens on a UNIX address family socket (i.e. local socket) for requests from the QoS-enhanced Socket API 218 and also listens on a netlink address family socket for reported changes to the available bandwidth of the network device. The QoS-enhanced Socket API function may be implemented as a library of C functions that send the QoS requests from the application to the QoS Service Provider 230. The QoS Service Provider 230 may attempt to map a QoS request to a DiffServ class that will be able to provide the requested level of QoS. If successful, the QoS Service Provider 230 will create a classifier to map the packets of that network connection to the appropriate DiffServ class. The QoS-enhanced Socket API 218 will then just use the native socket functionality of the operating system to create the actual network connection.

In one embodiment, the QoS Service Provider 230 manages the DiffServ implementation on only one network interface and does not check whether the QoS-enhanced Socket API 218 connection actually goes through the monitored interface. In alternate embodiments, the QoS Service Provider 230 is adapted to manage multiple network interfaces. The QoS Service Provider 230 may be adapted to process Transmission Control Protocol (TCP) connections, User Datagram Protocol (UDP) connections, or any other suitable protocols and connections.

As noted above, embodiments of the present invention include an extension portion in the kernel 250 to account for the dynamic link state and bandwidth characteristics in a dynamic mobile environment, thereby dynamically updating the packet transmit scheduler as link states change. The extension portion is adapted to modify the service rates of its classes based on the bandwidth available to the node. This is especially important for wireless devices.

The problem can be divided into two parts. The first part is how the kernel 250 is notified of the new bandwidth. The second part is how the kernel 250 effects changes in the standard DiffServ portion based on the new bandwidth. Device notification to the kernel 250 of the new bandwidth may be accomplished by the specific device driver 260 associated with the given interface.

Regarding the second part of the problem, the kernel 250 effects changes in the standard DiffServ portion based on emulated new bandwidth updates. The DiffServ-based QoS provisioning is implemented within the operating system kernel 250 using Traffic Control elements, i.e., qdisc. A hierarchical token bucket (HTB) qdisc may be used as a scheduler with a plurality of classes. The plurality of classes may include a separate HTB class for each DiffServ class of expedited forwarding (EF), the four classes of assured forwarding (AF1, AF2, AF3, AF4), and best effort (BE). Each class may be assigned a guaranteed rate and a maximum rate. In addition, the filters that classify packets into the various classes can have policers attached to them that meter the flows going into particular classes in order to perform such actions as dropping or marking. Each policer has a specified rate. The specified rates may be specified as absolute values. In a static environment the network administrator can simply divide up the available bandwidth, as per local policy. However, in a dynamic environment, the sum of the rates of the service classes may be unequal to the bandwidth actually available to the network device at least some of the time.

In one embodiment, the HTB class for EF is a class of the HTB qdisc, while all the other classes are subclasses of another class of the HTB qdisc at the same level of the EF class. This may be done to isolate the EF class from the other classes, while allowing the other classes to borrow bandwidth from each other if they are not being used. In preferred embodiments, the EF class has the highest priority, the AF classes have the next highest priority and the BE class has the lowest priority. Thus, the AF classes get the first use of any unused bandwidth and the BE class gets to borrow any extra bandwidth only if the AF classes are not using it.

The architecture 200 may perform a notification of a user-level daemon program by the operating system kernel 250 that the available bandwidth has changed, and may be further perform a calculation of new rates for the HTB classes and the policers based on the new bandwidth and the update of the corresponding TC elements in the kernel 250 by way of rtnetlink sockets. In one embodiment, the notification of the user-level daemon of the change in bandwidth is performed using the NETLINK_ROUTE family of the AF_NETLINK socket protocol, a socket protocol generally known in the relevant art. The AF_NETLINK protocol may be used to transfer information between kernel modules and user space processes. The AF_NETLINK protocol also has a broadcast capability. More specifically, the daemon process may open a NETLINK_ROUTE socket and, when binding to that socket, may specify that it wishes to receive broadcast information on an RTMGRP_LINK group. The kernel 250 may then send a broadcast message to the RTMGRP_LINK group whenever the link status has changed on a network device. A bandwidth component may be added to the broadcast message.

In the event that it is desirable to emulate a change in link status as if it was reported by the network device through the device driver 260, the device driver 260 is modified to provide the link state information via Netlink sockets to the QoS Service Provider 230. A file in a /proc file system may be used. In one embodiment, files in the /proc file system are simply linked to functions in the kernel 250 that are executed whenever any user-level process reads from one of the /proc files. The functions in the kernel 250 may return data from the kernel 250 as if the data were in the files. In one particular embodiment, a file /proc/net/bw-eth1 may be implemented with a function that will change the reported bandwidth value periodically as well as call the netlink function that initiates the broadcasts to the RTMGRP_LINK group. In alternate embodiments, the /proc file system based mechanism may be implemented to emulate dynamic changes in link state, or alternately, the device driver 260 will monitor the actual links state 262 and report updates.

In operation, a user-level daemon may initially read a configuration file that specifies the percentages of available bandwidth that are to be allocated to each DiffServ class, the DiffServ class to HTB class mapping, a list of policers and their percentages, and a list of which filters are using which policers. The daemon may then request to be notified of RTMGRP_LINK group messages. When the daemon receives notification of a bandwidth change through the netlink socket, it may recalculate all of the rates, and may make changes to the appropriate qdiscs and filters in the kernel 250 by way of rtnetlink sockets. The daemon may also notify any application that has requested to be notified of any change in the link status as described more fully below.

In one embodiment, the architecture 200 includes a link state change notification capability. As mentioned above, the AF_NETLINK socket protocol has a broadcast capability. A broadcast function in /usr/src/linux/net/core/rtnetlink.c that performs a broadcast for the RTMGRP_LINK group is, in one embodiment, designated as rtmsg_ifinfo. The broadcast function first calls a rtnetlink_fill_ifinfo function and then calls a netlink_broadcast function to send the message to all processes listening to the RTMGRP_LINK group. The rtnetlink_fill_ifinfo function retrieves data from the netdevice data structure and fills in the socket message buffer. It also uses the message tags IFLA_*, such as IFLA_ADDRESS, IFLA_MTU, etc., to indicate what data is being returned in the socket message buffer. These tags are defined in a folder, such as /usr/src/linux/include/linux/rtnetlink.h. A flag tag IFLA_UNSPEC may be used to return the new bandwidth value. The new bandwidth value may be stored in the netdevice data structure, or alternately, it may be stored in a new global variable, such as a global variable called bandwidth_for_our_test. This variable may, for example, be set by the function tied to the /proc/net/bw-eth1 file. Another function, designated as bw_get_info, may return the value of bandwidth_for_our_test whenever /proc/net/bw-eth1 is read. It may also have a counter that causes it to toggle the value of bandwidth_for_our_test. In one particular embodiment, for example, the bw_get_info function may toggle between 10 Mbps and 100 Mbps every twenty reads. Whenever the bw_get_info function changes the value of bandwidth_for_our_test, it may also call another function designated rtmsg_ifinfo in order to initiate an RTMGRP_LINK group broadcast message. A perl script may be adapted to periodically drive the changes, for example, at 1 second intervals.

The architecture 200 may perform a traffic control function. In one embodiment, when the user-level daemon program starts, the Linux Traffic Control (TC) elements may have no concept of the different DiffServ classes, so the architecture 200 must be told which HTB classes represent which DiffServ classes. The architecture 200 may also need to be told what percentage of available bandwidth is to be allocated to the different DiffServ classes, as well as what percentages to use for the different policers and which filters use which policers. The information about filters may be necessary since the parameters of the policers may not be changeable. In one embodiment, rates may be changed by changing the filters and attaching a new policer to the new filters with the newly calculated rates, effectively discarding the old policers.

After reading in the configuration information, the daemon may open a socket connection with the AF_NETLINK socket protocol and then may bind to that socket after setting the nl_groups field in the sockaddr_nl data structure to RTMGRP_LINK group. The daemon may then listen to the socket, using select, and may wait for any broadcast message. After receiving a link-change message, the program may retrieve the new bandwidth value from the netlink message buffer and may recalculate the rates for the HTB classes and policers based on the percentages defined in the configuration file. All the necessary information may then be put into netlink message buffers and sent to the TC elements in the kernel 250 by way of a netlink socket.

In some embodiments as described above, an extension portion is added to the standard DiffServ portion. However, a system herein is not so limited. In other embodiments, the DiffServ portion may be modified to track changes in link states.

The QoS Service Provider 230 may be further adapted to use the QoS-enhanced Socket API 218 functions to send strings to and from a server, in order to illustrate the use of the API and verify that the QoS-enhanced Socket API functions are performing correctly. In one particular embodiment, for example, an FTP client in the generally-known netkit-ftp-0.17 may be modified to call the QoS-enhanced Socket API 218.

The QoS-enhanced socket API 218 may be adapted with the following functions to manage a given connection from both monitoring and management perspective. These functions are building blocks that allow session QoS provisioning to be updated in a dynamic networking environment.

As described above, the QoS Service Provider 230 may listen on an AF_UNIX socket, waiting on messages from applications using the QoS API. Upon receiving a request, the QoS Service Provider 230 may attempt to satisfy the request and then return success or failure. The QoS Service Provider 230 may also be adapted to map a request to a DiffServ class in the underlying DiffServ implementation. It could be enhanced to use IntServ as well, using some runtime option to decide which mechanism to use. The QoS-aware application would be unaware which QoS provisioning mechanism was being used.

In one aspect, a QSocket function creates an endpoint for communication and returns a file descriptor on success, or −1 if an error occurred. The QSocket function may open a standard socket and send a request message to the QoS Service Provider 230, which may include the file descriptor of the socket, the process id of the application, and the parameters in the qos_info structure. The QoS Service Provider 230 may use the file descriptor of the socket and the process id of the application as the unique index for this connection. Since the socket call does not specify an endpoint, the QoS Service Provider 230 cannot map this connection to a DiffServ class yet, so it merely creates a soft state for this connection and saves the parameters in the qos_info structure.

In one particular embodiment, a QConnect function connects to a specific host and port combination and returns a zero on success, or −1 if an error occurred. The QConnect function may call the standard connect function which may assign a local address and port number. The QConnect function may then call getsockname to retrieve the assigned local address and port number. The destination address and port number are retrieved from the sockaddr structure. The QConnect function may finally send a setup message to the QoS Service Provider 230, which consists of the file descriptor of the socket, the process id of the application, the local address and port, and the destination address and port. The QoS Service Provider 230 may then analyze the DiffServ status on the network interface for this connection. The QoS Service Provider 230 may first consider the value of the qosmech field in the qos_info structure that was stored in the call to QSocket, which may have the value of QOS_ANY, QOS_DIFFSERV, or QOS_INTSERV. If the qosmech field has the value of QOS_ANY, the QoS Service Provider 230 may consult two parameters in the flow_spec substructure of the qos_info structure. If there is a latency requirement, the QoS Service Provider 230 attempts to map this connection to the EF class. The QoS Service Provider 230 compares the rate requirement to what is available for that class (allocated rate minus current usage). If there is not a latency requirement, the QoS Service Provider 230 attempts to map this connection to an AF class in the same way as for the EF class. If the qosmech field has the value of QOS_DIFFSERV, the QoS Service Provider 230 will attempt to map this connection to the DiffServ class as specified in the diffservclassrequest field of the qos_info structure in the same manner as described above. In one particular embodiment, the QOS_INTSERV mechanism may be treated in the same manner as QOS_ANY. If the request is successfully mapped to a DiffServ class, the QoS Service Provider 230 may then create a TC filter to map packets for this connection to the HTB class that represents the selected DiffServ class and return success to the QConnect function. If the QoS Service Provider 230 is unsuccessful, it returns failure to the QConnect function, which will close the socket and return an error.

A QChange function updates the QoS information associated with an existing file descriptor and returns a zero on success, or −1 if an error occurred. The QChange function may attempt to map the request to a DiffServ class as described in the QConnect function. If successful, the QChange function may have been mapped to the same class or a different class. If unsuccessful, the QChange function will retain the current mapping.

A QClose function closes the associated file descriptor created via a QSocket function and returns a zero on success, or −1 if an error occurred. The QClose function will close the standard socket and send a clear request to the QoS Service Provider 230, which includes the file descriptor of the socket and the process id of the application. The QoS Service Provider 230 may free all memory associated with this connection, delete the TC filter for it, and, if the application had requested any notifications, may remove the message queue to that application and any pending event notifications.

A QAttach function may associate an existing socket file descriptor with QoS information and may return a zero on success, or −1 if an error occurred. A QSendto function may send a message over an existing QSocket to a peer and returns the number of bytes sent on success, or −1 if an error occurred. A QSend function sends a message over an existing QSocket in connected state to a peer and returns the number of bytes sent on success, or −1 if an error occurred. The QSend function will directly call the standard Send function.

A QStateUpdateNotification function sets a callback function and returns a zero on success, or a −1 if an error occurred. The QStateUpdateNotification function will send a callback message to the QoS Service Provider 230, which may include a file descriptor of the socket, a process id of the application, and an event type from the notification_type structure. The QoS Service Provider 230 will add this request to the pending event list. The QStateUpdateNotification function may add the file descriptor, event type, context block, and callback function to its pending event list. When there is an event of that type, the QoS Service Provider 230 may remove the notification from the pending event list, create a message queue for the application process and put a message on the queue. In one particular embodiment, every function in the QoS API immediately checks to see if there are any messages on its message queue. If there are, then the function reads each message, matches it up with the appropriate entry in it pending event list, removes that entry, and calls the designated callback function.

A QStatus function retrieves status information associated with an existing file descriptor and returns a zero on success, or −1 if an error occurred. The QStatus function will send a status message to the QoS Service Provider 230, which may include the file descriptor of the socket and the process id of the application. The QoS Service Provider 230 may retrieve the current statistics from the DiffServ implementation and may return the data to the QStatus function, which fills in values of the qos_status structure.

Figure 4:
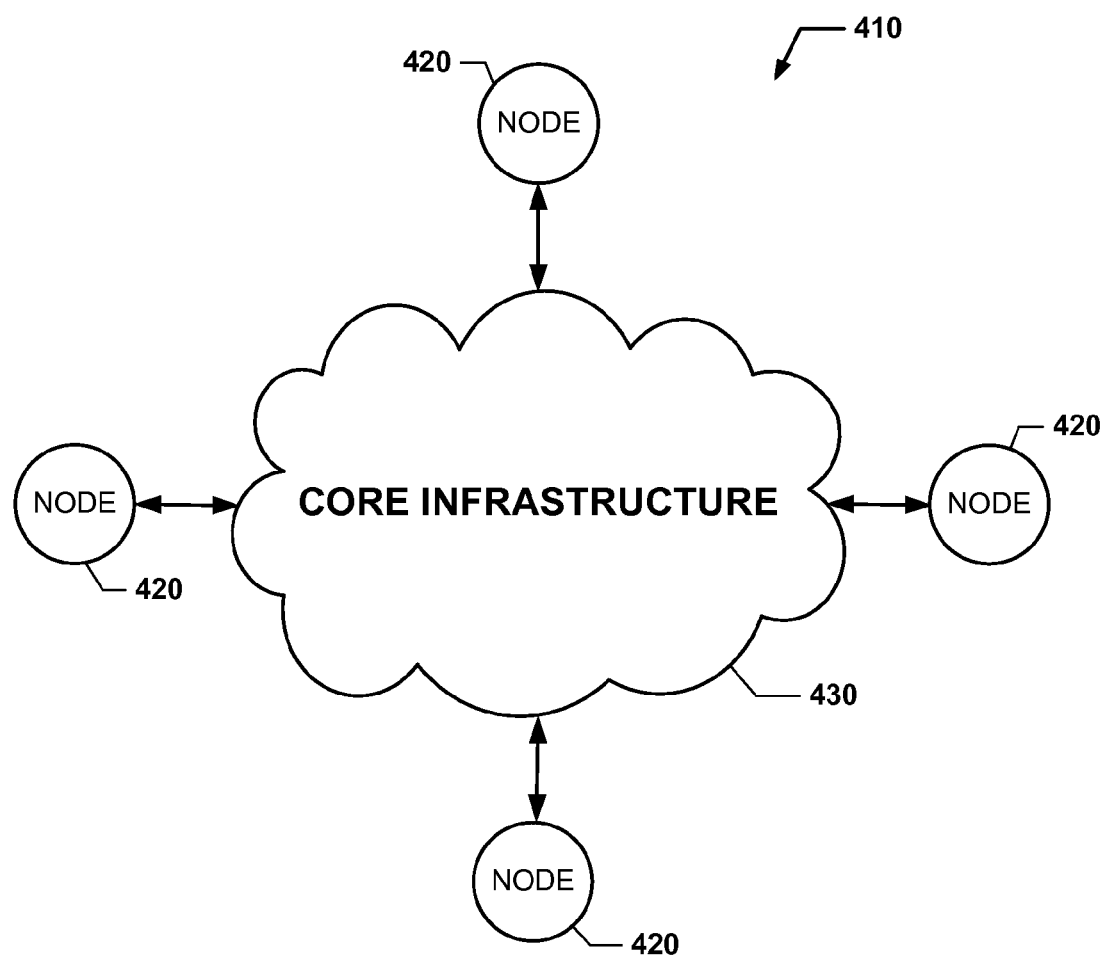
FIG. 4 is an illustration of a mobile ad hoc network.

Reference is now made to FIG. 4, which illustrates a mobile ad hoc network 410 including a plurality of network nodes. The network nodes in the network 410 of FIG. 5 include nodes 420 that are on the edge of a core infrastructure 430 and nodes (not shown) within the interiors of the core infrastructure 430. The edge nodes 420 may communicate wirelessly with the core infrastructure 430. The core infrastructure 430 may include intermediate mobile and fixed nodes using either wireless or wired communication media. It is the wireless communication media that poses the challenges with dynamic link state in terms of link data rate and bit error rates.

Some of these nodes in the network 410 may represent only clients, some only servers, and some may have both server and client functionality. Any network node in the network 410 may use a method herein to improve network end-to-end resource allocation to help to ensure that QoS requirements of various traffic flows are at least partially satisfied. Any network node in the network 410 may also use a method herein to improve network end-to-end resource allocation to help to ensure that QoS requirements of various traffic flows are at least partially satisfied.

A network herein is not limited to a mobile ad hoc network. In some embodiments, the network may have a fixed, stable core infrastructure with mobile nodes at the edges. The edge nodes are mobile by the infrastructure is stable and more static in nature. One such network is a cellular data network.

It is inherent that a network node is used to implement a method herein.

Figure 5:
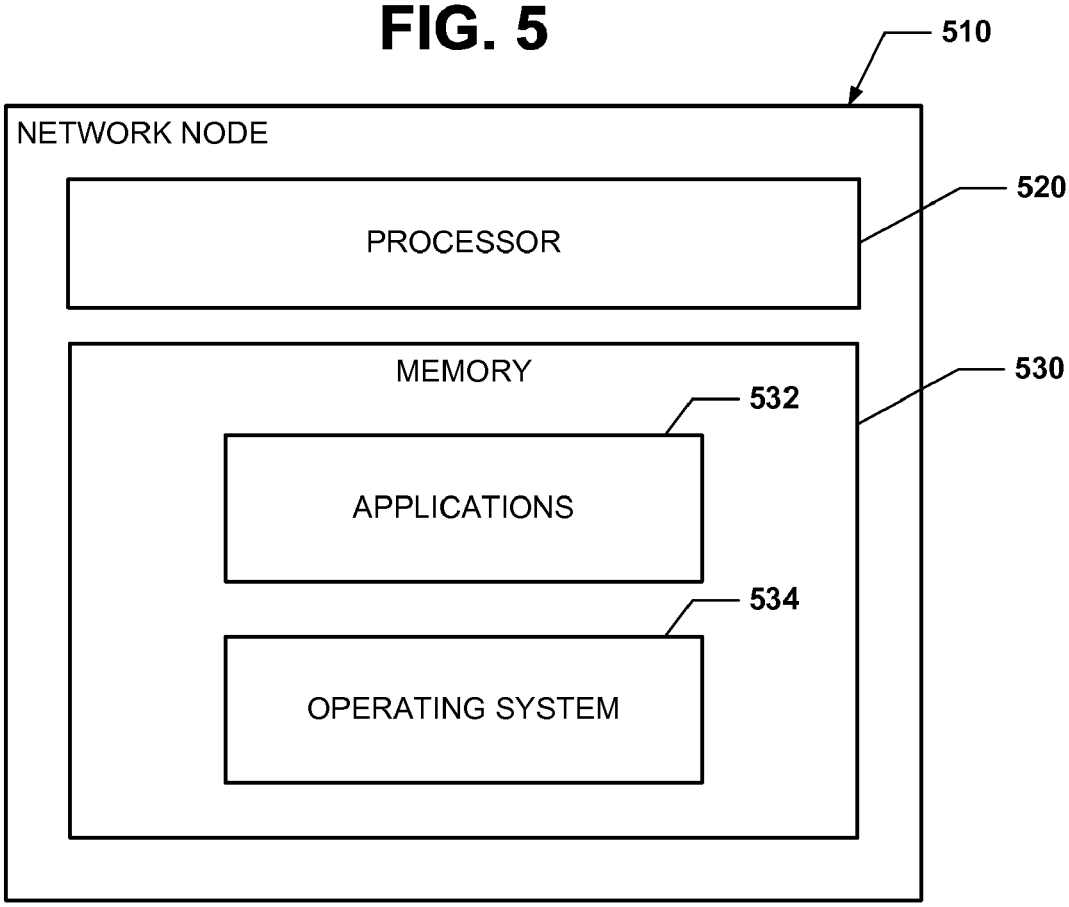
FIG. 5 is an illustration of a hardware implementation of an architecture for achieving end-to-end QoS provisioning.

Reference is now made to FIG. 5, which illustrates an example of a network node 510. The network node 510 includes a processing unit 520 and a computer-readable medium, such as memory 530. The memory 530 stores an operating system 534 and applications 532, including those components for implementing the architecture 200 of FIG. 2b. Thus, the operating system 534 includes the kernel 250 and the device driver 260, and the applications 532 include the QoS-aware applications 214, legacy applications 212, the QoS Service Provider 230 and the QoS-enhanced Socket API 218. The standard Socket API 216 straddles the user and kernel modes 210 and 250.

In hardware implementations that do not strictly have a kernel and user mode separation, the kernel portion only implies the portion of the node where the physical, link, and network layers of the OSI stack have been implemented.

A network node is not limited to the communications, networking capability and QoS provisioning functionality described herein. A network node may perform other functions as well. For example, a network node could have the functionality of a mobile phone, a mobile platform (e.g., a train, bus, airplane, ship), a fixed/mobile wireless infrastructure that provides video/audio/data services, a networked home/office appliance (e.g., an electricity meter, refrigerator, fax/copying machine), etc.

The invention claimed is:

1. A network node for a network having dynamic link states, the network node comprising a processing unit and computer-readable memory for causing the processing unit to:

monitor a link state of the network;

perform QoS provisioning and make appropriate updates to the QoS provisioning based on changes in the link state and QoS provisioning demands of QoS-aware applications; and provide notification to the QoS-aware applications to allow those applications to dynamically adapt to the link state changes.

2. The network node of claim 1, wherein the memory stores an operating system kernel that includes a network stack; wherein the memory further stores applications that include the QoS-aware applications and also a QoS Service Provider for performing the QoS provisioning; and wherein lower layer network stack elements detect the changes in real-time and notify the QoS Service Provider.

3. The network node of claim 2, wherein the Qos Service Provider interfaces with the operating system kernel via a standard Socket API; and wherein the QoS Service Provider interfaces with the QoS-aware applications via a QoS-enhanced Socket API.

4. The network node of claim 3, wherein lower layer network stack elements perform the link state monitoring and updating of a Traffic Control scheduler of the kernel; and wherein information from the monitoring is conveyed to the QoS Service Provider via the QoS-enhanced Socket API;

whereby the QoS-aware applications do not have to track the link states.

5. The network node of claim 4, wherein filter and policer configurations of the scheduler are updated dynamically as link states change.

6. The network node of claim 1, wherein at least one service rate of packet travel is adjusted by notifying of a variation in the available bandwidth, and a change in control of the packet rate of travel is affected.

7. The network node of claim 1, wherein the QoS provisioning adjusts at least one service rate of packet travel by scheduling a plurality of service rates using a queuing discipline.

8. The network node of claim 1, wherein the QoS provisioning notifies a user-level daemon program of a variation in the available bandwidth.

9. The network node of claim 1, wherein the QoS provisioning maps a connection to an appropriate QoS provisioning mechanism using at least one of a QSocket function adapted to create an endpoint for communication, a QConnect function adapted to connect to a specific host and port combination, a QChange function adapted to update a QoS information associated with an existing file descriptor, a QClose function adapted to close an associated file descriptor, a QAttach function adapted to associate an existing socket file descriptor with QoS information, a QStateUpdateNotification function adapted to set a callback function, and a QStatus function adapted to retrieve a status information associated with an existing file descriptor.

10. A network comprising a core infrastructure and a plurality of nodes according to claim 1 for communicating wirelessly with the core infrastructure, the nodes at an edge of the core infrastructure.

* * * * *